United States Patent
Kamiyama

(10) Patent No.: US 11,465,454 B2
(45) Date of Patent: *Oct. 11, 2022

(54) VEHICLE WHEEL

(71) Applicant: HONDA MOTOR CO., LTD., Tokyo (JP)

(72) Inventor: Youichi Kamiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 560 days.

This patent is subject to a terminal disclaimer.

(21) Appl. No.: 16/582,260

(22) Filed: Sep. 25, 2019

(65) Prior Publication Data

US 2020/0101801 A1 Apr. 2, 2020

(30) Foreign Application Priority Data

Sep. 27, 2018 (JP) .............................. JP2018-182397

(51) Int. Cl.
*B60C 19/00* (2006.01)
*G10K 11/172* (2006.01)

(52) U.S. Cl.
CPC .......... *B60C 19/002* (2013.01); *G10K 11/172* (2013.01)

(58) Field of Classification Search
CPC ........... G10K 2210/1282; G10K 15/02; G10K 2210/128; G10K 2210/129; G10K 2210/3016
USPC .................................................. 381/86, 71.4
See application file for complete search history.

(56) References Cited

U.S. PATENT DOCUMENTS

| 10,576,780 | B2* | 3/2020 | Kim ..................... B60C 19/002 |
| 11,298,975 | B2* | 4/2022 | Saito ..................... B60B 21/026 |
| 2015/0047920 | A1* | 2/2015 | Zhu ........................ B60C 19/002 29/894.31 |
| 2019/0210405 | A1* | 7/2019 | Shin ........................ B60B 21/12 |
| 2019/0232732 | A1* | 8/2019 | Kirby ...................... B60C 5/002 |
| 2020/0276862 | A1* | 9/2020 | Kamiyama .............. B60B 21/12 |
| 2020/0316988 | A1* | 10/2020 | Seung ...................... B60B 21/12 |

FOREIGN PATENT DOCUMENTS

JP         5411819 B2     2/2014

* cited by examiner

*Primary Examiner* — Alexander Krzystan
(74) *Attorney, Agent, or Firm* — Rankin, Hill & Clark LLP

(57) ABSTRACT

A vehicle wheel includes a rim and a sub-air chamber member attached to the rim and serving as a Helmholtz resonator that cancels air column resonance noise in a tire air chamber. The sub-air chamber member includes: a main body portion including a top plate, a bottom plate, and a side plate connecting between the top plate and the bottom plate, the main body portion defining an inner space surrounded by the top plate, the bottom plate, and the side plate and serving as a sub-air chamber; and a communication through-hole that allows communication between the tire air chamber and the sub-air chamber. The main body portion further includes a substantially cone-shaped portion formed integrally with the bottom plate and the side plate.

4 Claims, 7 Drawing Sheets

VEHICLE WHEEL

CROSS-REFERENCE TO RELATED APPLICATIONS

The present application claims priority under 35 U.S.C. § 119 to Japanese Patent Application No. 2018-182397, filed Sep. 27, 2018, the contents of which are hereby incorporated by reference in their entirety.

BACKGROUND OF THE INVENTION

1. Field of the Invention

The present invention relates to a vehicle wheel.

2. Description of the Related Art

There is known a vehicle wheel having a rim and a Helmholtz resonator (sub-air chamber member) that extends on an outer circumferential surface of a well portion of the rim along a wheel circumferential direction thereof to cancel air column resonance noises in a tire air chamber (see, for example, Japanese Patent No. 5411819). This sub-air chamber member has a top plate and a bottom plate extending parallel to each other in the wheel circumferential direction and defining a hollow space therebetween serving as a sub-air chamber.

The sub-air chamber member includes tubular portions each partially connecting between the top plate and the bottom plate. Each tubular portion is formed of opposite portions of the top plate and the bottom plate that are each partially recessed toward the inside of the sub-air chamber member. A plurality of the tubular portions are aligned with each other on the sub-air chamber member in the wheel circumferential direction at regular intervals. The tubular portions are aligned on the sub-air chamber member in multiple lines in the wheel circumferential direction.

These tubular portions restrains variation in the volume of the sub-air chamber which is caused in connection with variation in the sound pressure level at the resonance, by increasing the surface rigidity of the top plate and the bottom plate connected by the tubular portions. The sub-air chamber having such a tubular portion improves air column resonance noise cancellation performance by restraining variation in the volume of the sub-air chamber member.

SUMMARY OF THE INVENTION

Generally, a conventional sub-air chamber member (see, for example, Japanese Patent No. 5411819) includes a top plate, a bottom plate, and side plates connecting between the top plate and the bottom plate at wheel circumferential end portions and at wheel widthwise end portions.

However, the above-described tubular portions cannot practically be formed for the side plates and thus the surface rigidity of the side plates cannot be improved sufficiently.

It is desirable to improve the surface rigidity of the side plates not by means of the tubular portions, to thereby improve the noise cancellation performance of the vehicle wheel.

An object of the present invention is to provide a vehicle wheel excellent in noise cancellation performance compared to conventional vehicle wheels.

An aspect of an embodiment according to the present invention is a vehicle wheel includes a rim and a sub-air chamber member attached to the rim and serving as a Helmholtz resonator that cancels air column resonance noise in a tire air chamber. The sub-air chamber member includes: a main body portion including a top plate, a bottom plate, and a side plate connecting between the top plate and the bottom plate, the main body portion defining an inner space surrounded by the top plate, the bottom plate, and the side plate and serving as a sub-air chamber; and a communication through-hole that allows communication between the tire air chamber and the sub-air chamber. The main body portion further includes a substantially cone-shaped portion formed integrally with the bottom plate and the side plate.

The present invention provides a vehicle wheel excellent in noise cancellation performance compared to conventional vehicle wheels.

BRIEF DESCRIPTION OF THE DRAWINGS

FIG. 6A shows the result of the CAE analysis carried out on a sub-air chamber member according to the present embodiment; FIG. 6B shows the result of the CAE analysis carried out on a sub-air chamber member of a comparative example.

DETAILED DESCRIPTION OF THE EMBODIMENTS

Next, a vehicle wheel according to a mode (embodiment) for carrying out the present invention will be described in detail with reference to the drawings as appropriate. In the referenced drawings, "X" indicates a wheel circumferential direction, "Y" indicates a wheel width direction, and "Z" indicates a wheel radial direction.

A major feature of the vehicle wheel according to the present embodiment is that a sub-air chamber member (Helmholtz resonator) of the vehicle wheel includes a main body portion having an end portion at which a substantially cone-shaped portion is formed.

Note that a vehicle wheel of the present embodiment will be described by exemplifying a sub-air chamber member having a wheel circumferential end portion at which a substantially cone-shaped portion is formed. However, according to the present invention, the substantially cone-shaped portion may be formed at a wheel widthwise end of the sub-air chamber member.

Hereinafter, a description will be given of the whole structure of the vehicle wheel and then a description will be given of the sub-air chamber member.

Overall Configuration of Vehicle Wheel

Figure 1:
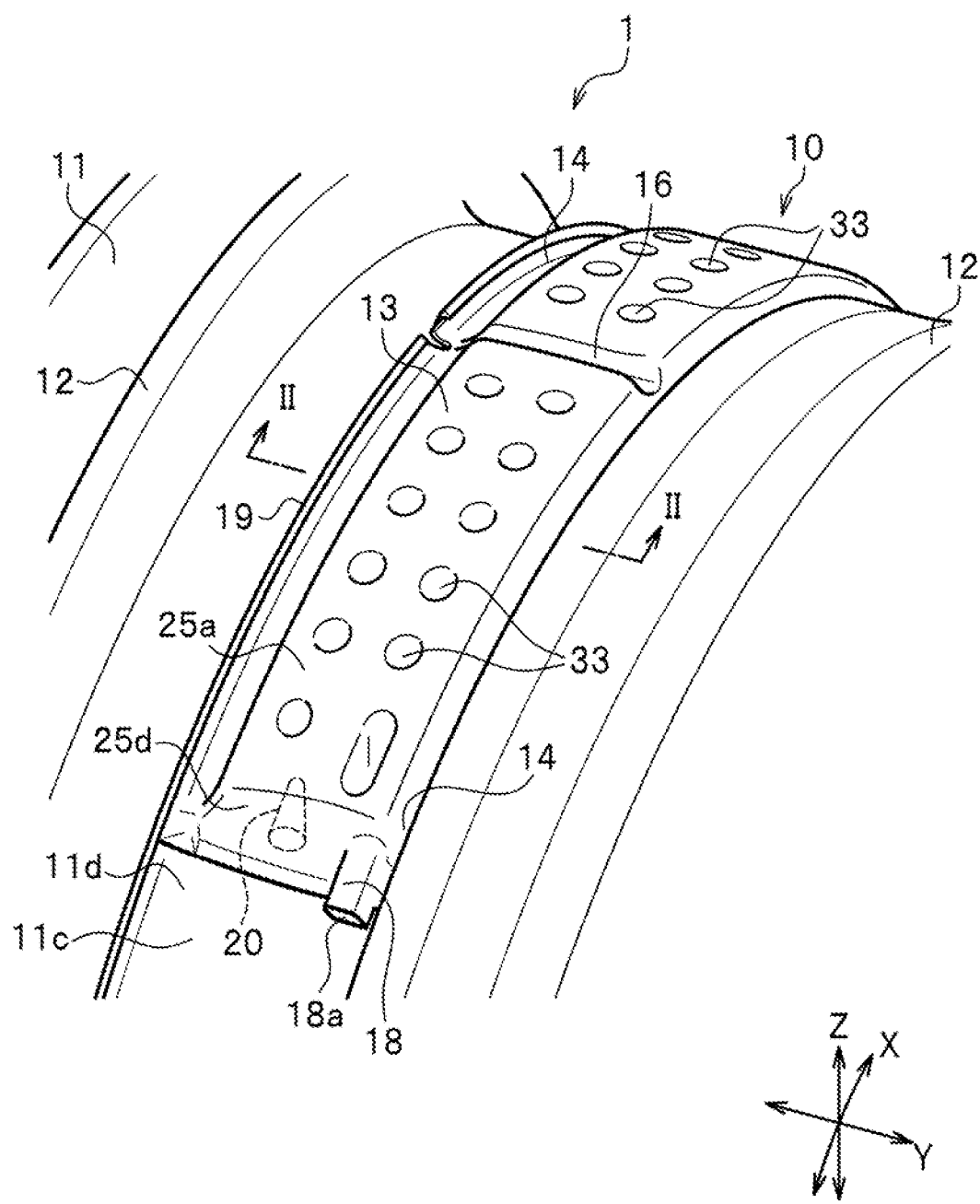
FIG. 1 is a partially enlarged, perspective view of a vehicle wheel according to an embodiment of the present invention. The perspective view includes a Helmholtz resonator (sub-air chamber member) attached to an outer circumferential surface of a well portion of the vehicle wheel.

FIG. 1 is a partially enlarged, perspective view of a vehicle wheel 1 according to the present embodiment. The perspective view includes a sub-air chamber member 10 attached to an outer circumferential surface 11d of a well portion 11c of the vehicle wheel 1 and serving as a Helmholtz resonator.

As shown in FIG. 1, the vehicle wheel 1 according to the present embodiment includes a rim 11 and a sub-air chamber member 10 (Helmholtz resonator) attached to the rim 11. The rim 11 is made of a metal such as an aluminum alloy or a magnesium alloy. The sub-air chamber member 10 (Helmholtz resonator) is made of a synthetic resin such as polypropylene or polyamide. Incidentally, the rim 11 of the present embodiment is assumed to be formed by casting and the sub-air chamber member 10 of the embodiment is assumed to be formed by blow-molding.

Incidentally, although not illustrated, a disc that couples the rim 11 to a hub is located in the wheel width direction Y from the rim 11, i.e., on the left side of the drawing plane of FIG. 1.

The rim 11 has two end portions that are opposite to each other in the wheel width direction Y, at each of which a bead seat 12 is formed, and has a well portion 11c recessed inward in the wheel radial direction between the bead seats 12. A bottom surface of this recess defines an outer circumferential surface 11d of the well portion 11c. The outer circumferential surface 11d has a substantially constant diameter about the wheel axis along the wheel width direction Y.

Figure 2:
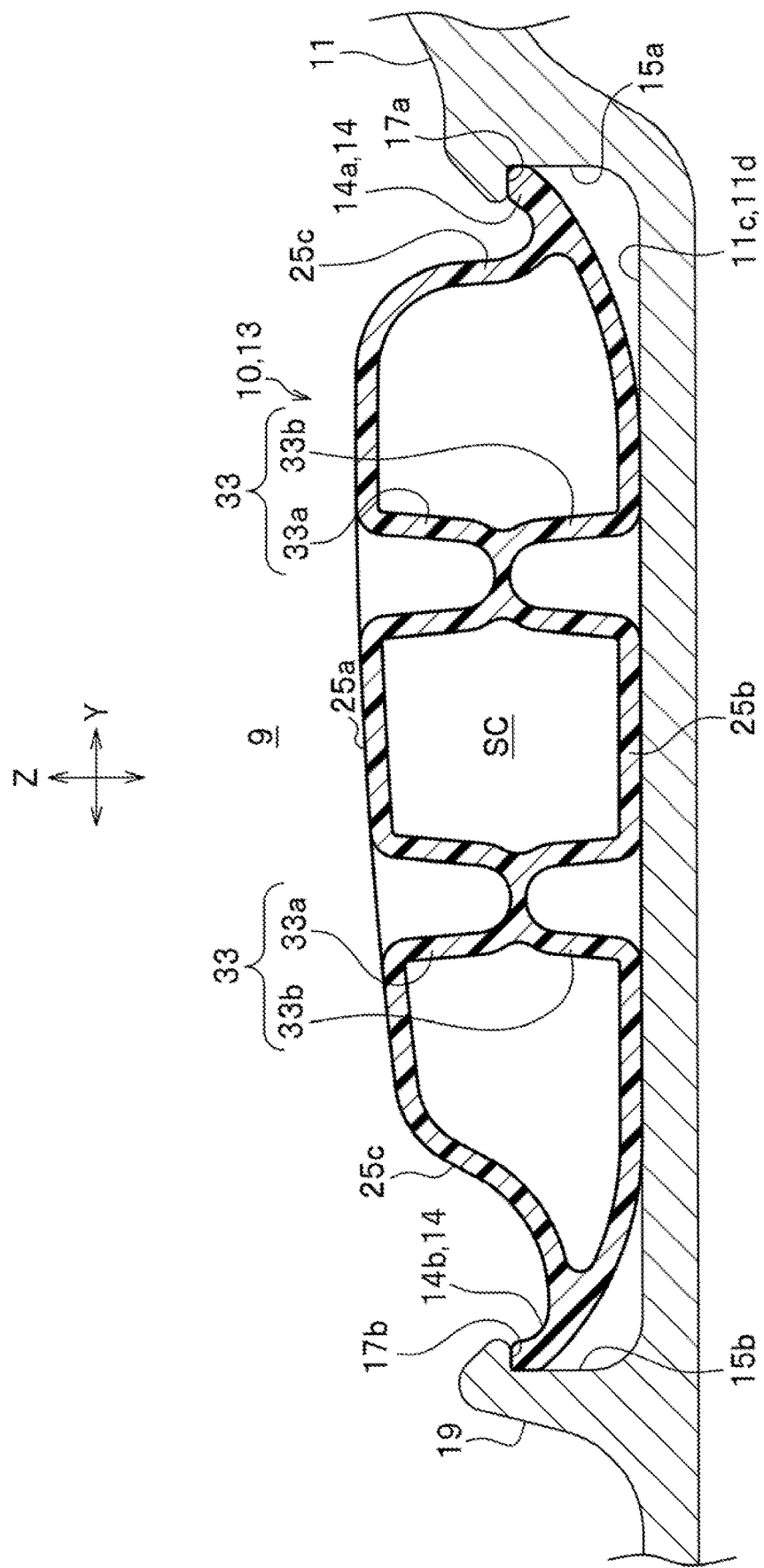
FIG. 2 is a cross-sectional view of the vehicle wheel, taken along line II-II in FIG. 1.

As shown in FIG. 2, the rim 11 according to the present embodiment includes a first vertical wall 15a and a second vertical wall 15b. These vertical walls 15a and 15b stand from the outer circumferential surface 11d outwardly in the wheel radial direction Z with a predetermined interval therebetween in the wheel width direction Y.

Incidentally, the first vertical wall 15a formed on one side located in the wheel width direction Y is formed at a rising portion that rises from the outer circumferential surface 11d of the well portion 11c toward a rim flange.

The second vertical wall 15b formed on the other side located in the wheel width direction Y is defined by a circumferential wall 19 that extends in the wheel circumferential direction X along a circumferential line of the outer circumferential surface 11d located substantially middle in the wheel width direction Y, and extends in the wheel circumferential direction X. The vertical walls 15a and 15b each extend annularly in the wheel circumferential direction X with a predetermined interval therebetween, to face each other.

The first vertical wall 15a and the second vertical wall 15b respectively have grooves 17a and 17b formed thereon into which edge portions 14 (14a, 14b) of the later-described sub-air chamber member 10 are respectively fitted. These grooves 17a, 17b are each formed along the wheel circumferential direction X to form an annular circumferential groove.

Sub-Air Chamber Member

Next, a description will be given of the sub-air chamber member 10.

Figure 3:
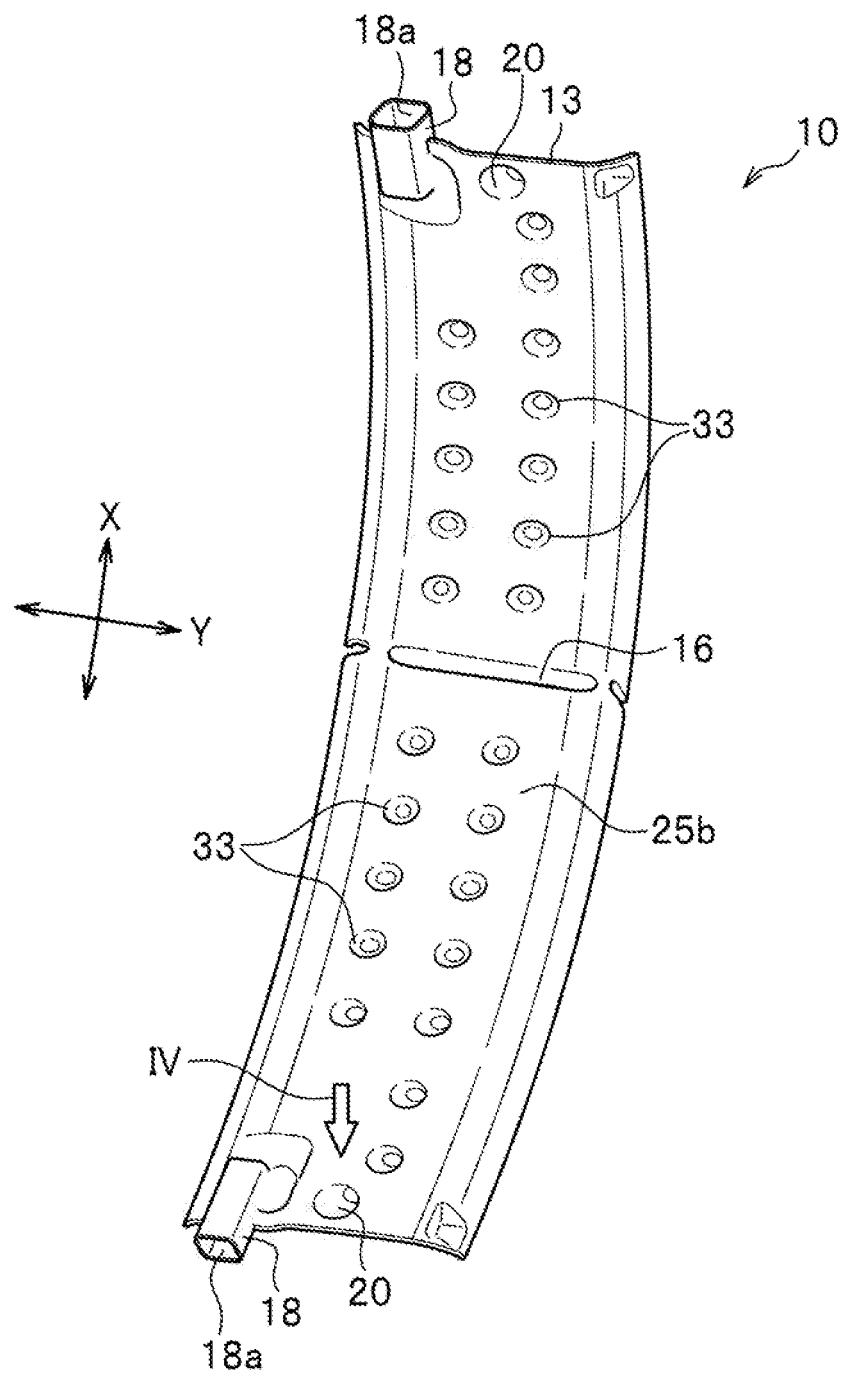
FIG. 3 is an overall perspective view of the sub-air chamber member.

As shown in FIGS. 1 and 3, the sub-air chamber member 10 is elongated in one direction and includes a main body portion 13, a pair of tube bodies 18 each having a communication through-hole 18a formed therein, and edge portions 14 for fixing the main body portion 13 to the rim 11.

This sub-air chamber member 10 has a partition wall 16 extending in the wheel width direction Y in the middle of the main body portion 13 and has a shape symmetrical about the partition wall 16 in the wheel circumferential direction X.

The main body portion 13 includes a substantially cone-shaped portion 20, which is indicated by the hidden line (dashed line) in FIG. 1. The substantially cone-shaped portion 20 will be described after the edge portions 14 are described.

The main body portion 13 is longitudinally curved. In other words, the main body portion 13 extends in the wheel circumferential direction X when the sub-air chamber member 10 is attached to the outer circumferential surface 11d of the well portion 11c (see FIG. 1).

The main body portion 13 has a hollow space inside. This hollow space (not illustrated) constitutes a sub-air chamber SC (see FIG. 2) described later. This hollow space is partitioned by the partition wall 16 in the wheel circumferential direction X into two halves. The partition wall 16 is defined by the later described top plate 25a and bottom plate 25b (see FIG. 3), which are depressed into a groove shape along the wheel width direction Y. Although not illustrated, the partition wall 16 is formed by the top plate 25a and the bottom plate 25b being joined to each other at a substantially central position between the top plate 25a and the bottom plate 25b.

FIG. 2 is a cross-sectional view of the vehicle wheel 1 shown in FIG. 1, taken along line II-II in FIG. 1.

As shown in FIG. 2, the main body portion 13 of the sub-air chamber member 10 has a flat shape elongated in the wheel width direction Y in a cross-sectional view orthogonal to the longitudinal direction (wheel circumferential direction X shown in FIG. 1) of the main body portion 13.

Specifically, the main body portion 13 includes a top plate 25a, a bottom plate 25b, two opposing side plates 25c, and two opposing side plates 25d.

The bottom plate 25b is a plate body formed to extend along the outer circumferential surface 11d of the well portion 11c. In other words, the bottom plate 25b extends substantially flat in the wheel width direction Y and extends in the wheel circumferential direction X (see FIG. 1) with substantially the same curvature as the curvature of the outer circumferential surface 11d.

The top plate 25a is curved in the wheel circumferential direction X (see FIG. 1) with a predetermined curvature so as to face the bottom plate 25b while keeping a predetermined distance therefrom.

The sub-air chamber SC is formed between the top plate 25a and the bottom plate 25b.

The side plates 25c respectively extend from two end portions of the bottom plate 25b which are opposite to each other in the wheel width direction Y to two end portions of the top plate 25a which are opposite to each other in the wheel width direction Y, and respectively join to the two end portions of the top plate 25a.

As shown in FIG. 1, the main body portion 13 includes the side plates 25d, which are respectively formed at two end portions of the main body portion 13 that are opposite to each other in the wheel circumferential direction X and which connect between the top plate 25a and the bottom plate 25b.

The sub-air chamber member 10 of the present embodiment has a shape symmetrical about the partition wall 16 in the wheel circumferential direction X. Thus, although illustration is omitted for the sake of simple illustration, the side plates 25d of the present embodiment are formed on the main body portion 13 at two end portions thereof located symmetrically opposite to each other in the longitudinal direction (wheel circumferential direction X) so as to form a pair.

Each substantially cone-shaped portion 20, which is indicated by the hidden line (dashed line) in FIG. 1 and will be described in detail later, is integrally formed with the top plate 25a, the bottom plate 25b, and one of the side plates 25d.

FIG. 3 is an overall perspective view of the sub-air chamber member 10, seen from the back side (from the bottom plate 25b side).

As shown in FIG. 3, the main body portion 13 includes multiple tubular portions 33 aligned at regular intervals in the wheel circumferential direction X. These tubular portions 33 are aligned in two rows in the wheel circumferential direction X.

Returning to FIG. 2, each tubular portion 33 has an upper joining portion 33a and a lower joining portion 33b which are joined to each other at a substantially center position between the top plate 25a and the bottom plate 25b.

The upper joining portion 33a is a portion of the top plate 25a that is partially recessed toward the bottom plate 25b. The lower joining portion 33b is a portion of the bottom plate 25b that is partially recessed toward the top plate 25a.

Each of the tubular portions 33 has a substantially circular cylindrical shape and partially connects between the top plate 25a and the bottom plate 25b. As shown in FIGS. 1 and 3, each tubular portion 33 has openings each having a circular shape in plan view at portions of the main body portion 13 which are opposite to each other in the wheel radial direction Z.

Next, a description will be given of the tube body 18 (see FIG. 1).

As shown in FIGS. 1 and 3, each tube body 18 is formed on one circumferential end of the main body portion 13 at a location near one wheel width direction Y end, so as to project from the main body portion 13 in the wheel circumferential direction X.

As described, the sub-air chamber member 10 of the present embodiment has a shape symmetrical about the partition wall 16 in the wheel circumferential direction X. As shown in FIG. 3, the tube bodies 18 of the present embodiment are formed on the main body portion 13 at two end portions thereof located symmetrically opposite to each other in the longitudinal direction (wheel circumferential direction X) so as to form a pair. Note that the pair of tube bodies 18 in the present embodiment are arranged at positions spaced at a substantially 90-degree interval about the wheel axis.

The communication through-hole 18a, shown in FIG. 3, extends from the inside of the tube body 18 and further extends inside the main body portion 13. The communication through-hole 18a allows communication between the sub-air chamber SC (see FIG. 2) formed inside the main body portion 13 and a tire air chamber 9 that is formed above the well portion 11c (see FIG. 2) between the well portion 11c and a tire (not shown).

Next, a description will be given of the edge portion 14 (see FIG. 2).

As shown in FIG. 2, the edge portion 14 includes an edge portion 14a and an edge portion 14b. The edge portion 14a extends from the main body portion 13 toward the first vertical wall 15a. The edge portion 14b extends from the main body portion 13 toward the second vertical wall 15b.

According to the present embodiment, the edge portion 14b has a longer length than the edge portion 14a.

The edge portions 14a, 14b and the bottom plate 25b integrally define a curved surface convex toward the outer circumferential surface 11d of the well portion 11c. For the edge portions 14a, 14b, a thickness and a material are appropriately selected to provide appropriate spring-constants therein.

A distal end of the edge portion 14a is fitted into the groove 17a of the first vertical wall 15a. A distal end of the edge portion 14b is fitted into the groove 17b of the second vertical wall 15b.

Next, the substantially cone-shaped portions 20, shown in FIG. 3, will be described in detail.

Each substantially cone-shaped portion 20 is formed at a wheel circumferential direction X end portion of the main body portion 13 of the sub-air chamber member 10.

Figure 4:
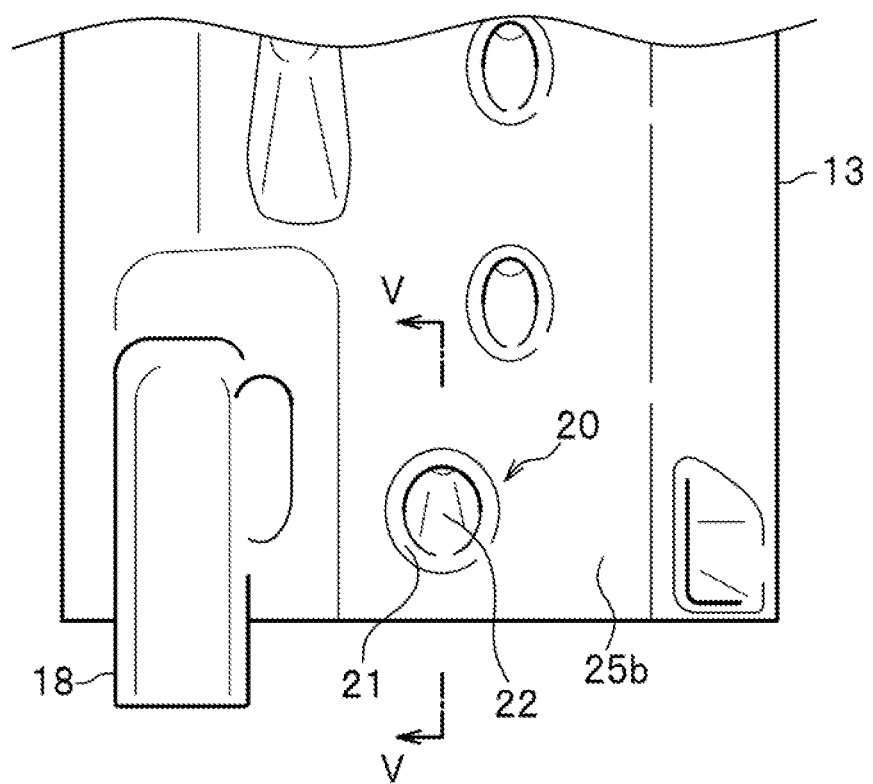
FIG. 4 is a partially enlarged view of the sub-air chamber member, showing the portion indicated with arrow IV in FIG. 3.
Figure 4:
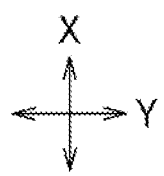
Figure 5:
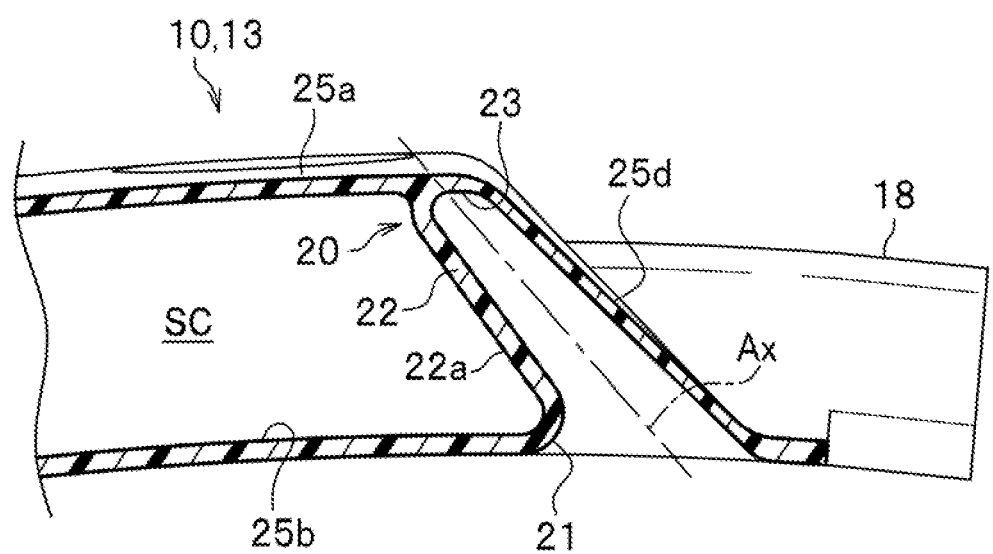
FIG. 5 is a cross-sectional view of the sub-air chamber member, taken along line V-V in FIG. 4.
Figure 5:
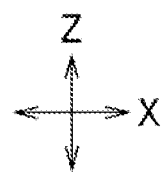

FIG. 4 is a partially enlarged view of the sub-air chamber member 10 as seen in the direction IV in FIG. 3. FIG. 5 is a cross-sectional view of the sub-air chamber member 10, taken along line V-V in FIG. 4.

As shown in FIG. 4, the substantially cone-shaped portion 20 is located substantially centrally relative to a wheel width direction Y length of the main body portion 13. More specifically, the substantially cone-shaped portion 20 according to the present embodiment is spaced apart from the corresponding tube body 18 in the wheel width direction Y. Note that the position of the substantially cone-shaped portion 20 is not limited to this configuration.

The substantially cone-shaped portion 20 according to the present embodiment may be substantially of the shape of a cone, a truncated cone, an n-gonal pyramid, or a truncated n-gonal pyramid, for example. Specifically, the substantially cone-shaped portion 20 is defined by a circumferential wall member 22 having an interior hollow space with an opening 21 on the bottom plate 25b side and having a decreasing circumferential length from the opening 21 toward the top plate 25a (see FIG. 1).

More specifically, the circumferential wall member 22, which defines the substantially cone-shaped portion 20, has a substantially triangle shape or a substantially trapezoid shape, the bottom of which corresponds to the opening 21, in cross-sectional view taken along the wheel circumferential direction X as shown in FIG. 5.

The substantially cone-shaped portion 20 according to the present embodiment is in a form of an inclined cone whose central axis Ax is inclined. Specifically, the central axis Ax of the substantially cone-shaped portion 20 is inclined at an angle that substantially conforms to the angle at which the corresponding side plate 25d, which is joined to the bottom plate 25b so as to define an acute angle therewith, is inclined.

The circumferential wall member 22, which defines the substantially cone-shaped portion 20, is formed integrally with the top plate 25a, the bottom plate 25b, and the corresponding side plate 25d.

More specifically, the opening 21 of the circumferential wall member 22 has a periphery having a circular shape and formed integrally with the bottom plate 25b; and the circumferential wall member 22 has an apex portion 23 located opposite to the opening 21 and formed integrally with the top plate 25a.

The circumferential wall member 22 is formed integrally with the corresponding side plate 25d along the inclined height of the substantially cone-shaped portion 20.

The top plate 25a, the bottom plate 25b, the corresponding side plate 25d, and the substantially cone-shaped portion 20 are joined, so that an outer wall surface 22a of the substantially cone-shaped portion 20 faces the sub-air chamber SC formed in the main body portion 13.

Operation and Advantageous Effects

Next, a description will be given of the operation and advantageous effects of the vehicle wheel 1 according to the present embodiment.

According to the configuration of the vehicle wheel 1 of the present embodiment, the circumferential wall member 22 defining the substantially cone-shaped portion 20 is formed integrally with the top plate 25a, the bottom plate 25b, and the corresponding side plate 25d.

The substantially cone-shaped portion 20 thus structured sufficiently increases the surface rigidity of an end portion of the main body portion 13, at which end portion the conventional tubular portion (see Japanese Patent No. 5411819) could not be formed by directly joining the two opposite faces (top plate and bottom plate) to each other due to the limitation imposed in relation to a direction in which molds are removed. As a result, the sub-air chamber member 10 of the present embodiment can restrain variation in the volume of the sub-air chamber SC which is caused in connection with variation in the sound pressure level at the resonance. Accordingly, the vehicle wheel 1 according to the present embodiment provides improved air column resonance noise cancellation performance by restraining variation in the volume of the sub-air chamber SC of the sub-air chamber member 10.

Figure 6A:
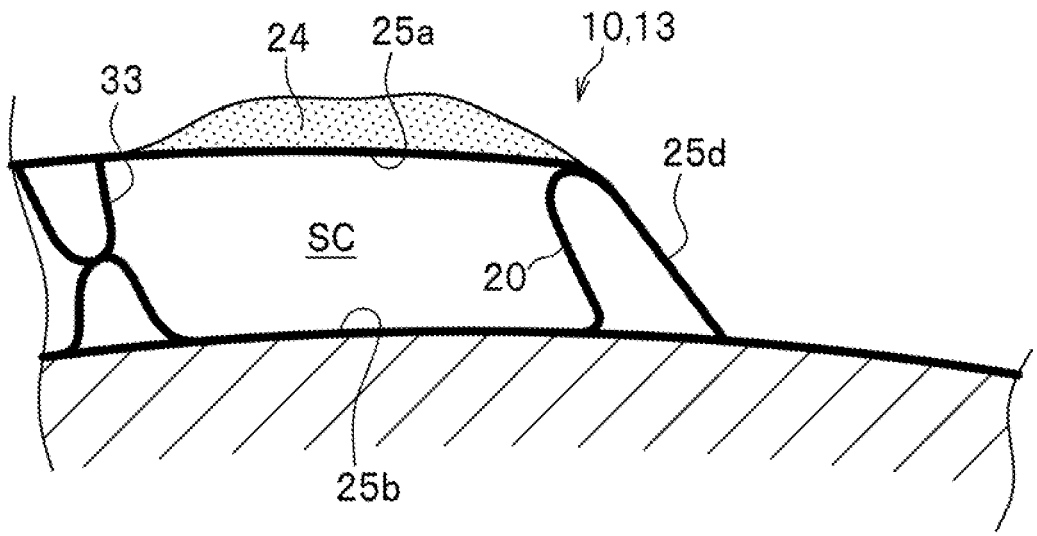
FIGS. 6A and 6B show a result of an analysis carried out by computer aided engineering (CAE), which illustrates the simulated deformation of a top plate and a side plate subjected to a predetermined pressure variation occurring in the sub-air chamber.
Figure 6A:
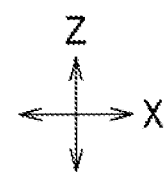
Figure 6B:
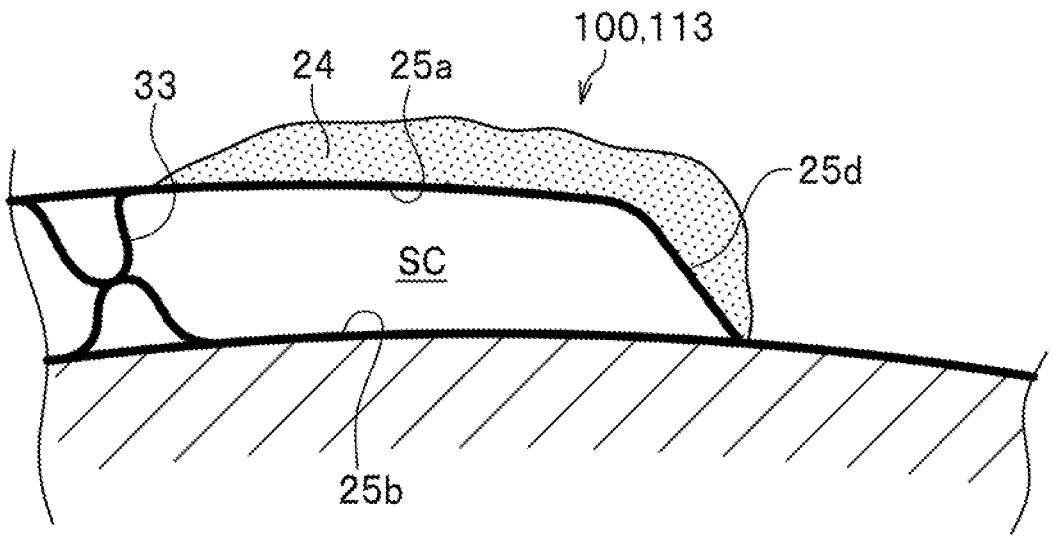
Figure 6B:
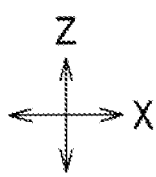

FIGS. 6A and 6B show a result of an analysis carried out by computer aided engineering (CAE), which illustrates the simulated deformation of the top plate 25a and the side plate 25d subjected to a predetermined pressure variation occurring in the sub-air chamber SC. FIG. 6A shows the result of the CAE analysis carried out on the sub-air chamber member 10 according to the present embodiment. FIG. 6B shows the result of the CAE analysis carried out on a sub-air chamber member 100 of a comparative example.

In FIG. 6A, reference numeral 13 denotes the main body portion of the sub-air chamber member 10 according to the present embodiment, which is arranged on the outer circumferential surface 11d of the well portion 11c. In FIG. 6B, reference numeral 113 denotes a main body portion of the sub-air chamber member 100 of the comparative example.

The main body portion 113 of the comparative example differs from the main body portion 13 of the present embodiment only in that the former does not include the substantially cone-shaped portion 20.

IN FIGS. 6A and 6B, the reference numeral 33 denotes the tubular portion.

As shown in FIG. 6A, although a deformation 24 (bulge) of the top plate 25a is observed between the tubular portion 33 and the substantially cone-shaped portion 20 at an end portion of the main body portion 13 of the present embodiment, there is no such deformation found on the side plate 25d.

In contrast, as shown in FIG. 6B, at an end portion of the main body portion 113 of the comparative example, a deformation 24 (bulge) is observed over the entire region from the top plate 25a to the side plate 25d except the tubular portion 33.

Therefore, on the basis of the result of the CAE analysis, it has been confirmed that the substantially cone-shaped portion 20 serves to reduce variation in the volume of the sub-air chamber SC.

The opening 21 of the substantially cone-shaped portion 20 corresponds to the bottom of the cone shape and is formed to face the bottom plate 25b.

When producing the sub-air chamber member 10 by a resin molding method, the substantially cone-shaped portion 20 with such a structure can be easily formed by a general resin molding method such as blow molding because molds are easily opened.

Although an embodiment of the present invention has been described above, the present invention is not limited to the embodiment described above and can be carried out in various modes.

Figure 7:
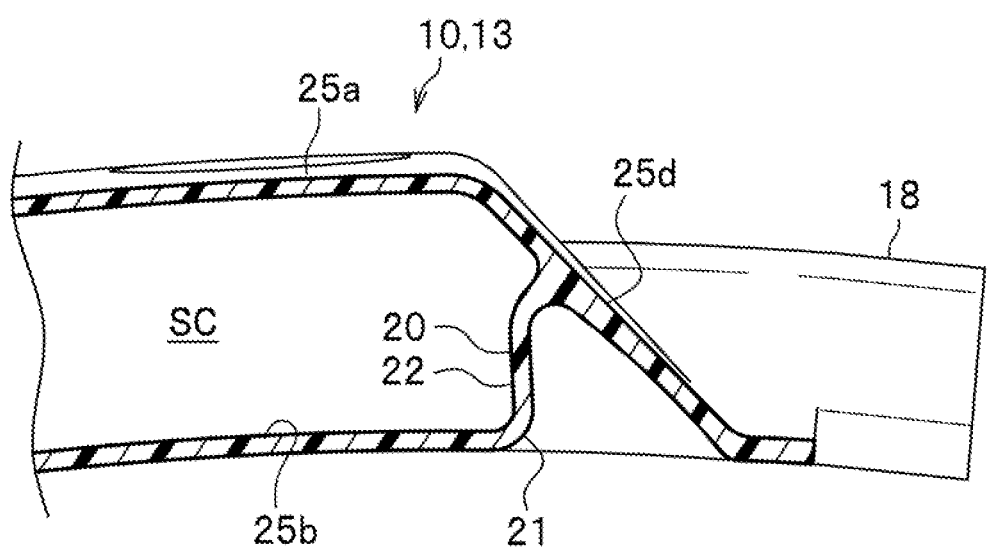
FIG. 7 is a cross-sectional view of a sub-air chamber member according to another embodiment.
Figure 7:
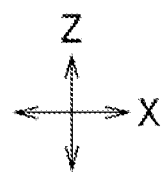

FIG. 7 is a cross-sectional view of a sub-air chamber member 10 according to another embodiment.

The apex portion 23 of the substantially cone-shaped portion 20 of the above-described embodiment (see FIG. 5) is formed integrally with the top plate 25a.

In contrast, the substantially cone-shaped portion 20 of the sub-air chamber member 10 according to the another embodiment shown in FIG. 7 is formed integrally only with the bottom plate 25b and the side plate 25d.

The substantially cone-shaped portion 20 according to the another embodiment has a smaller volume occupied in the sub-air chamber SC than the substantially cone-shaped portion 20 according to the above-described embodiment (see FIG. 5). Therefore, the sub-air chamber member 10 of the modification can have a larger volume of the sub-air chamber SC and thus can have improved noise cancellation performance.

Moreover, according to the structure of the vehicle wheel 1 of the above-described embodiment, the substantially cone-shaped portion 20 is formed at a wheel circumferential direction X end portion of the main body portion 13. However, the substantially cone-shaped portion 20 may be formed at a wheel width direction Y end portion of the main body portion 13.

What is claimed is:

1. A vehicle wheel comprising a rim and a sub-air chamber member attached to the rim, the sub-air chamber member serving as a Helmholtz resonator that cancels air column resonance noise in a tire air chamber,
    wherein the sub-air chamber member includes:
        a main body portion including a top plate, a bottom plate, and a side plate connecting between the top plate and the bottom plate, the main body portion defining an inner space surrounded by the top plate, the bottom plate, and the side plate and serving as a sub-air chamber; and
        a communication through-hole that allows communication between the tire air chamber and the sub-air chamber,
    wherein the main body portion further includes a substantially cone-shaped portion formed integrally with the bottom plate and the side plate,
    wherein the substantially cone-shaped portion is formed of a circumferential wall member having an inner hollow space with an opening on a bottom plate side and having a circumferential length decreasing from the opening toward the top plate,
    wherein the circumferential wall member is formed integrally with the side plate along an inclined height of the substantially cone-shaped portion, and
    wherein the opening of the substantially cone-shaped portion is formed to face the bottom plate.

2. The vehicle wheel of claim 1,
    wherein the sub-air chamber member extends in a wheel circumferential direction of the rim, and
    wherein the substantially cone-shaped portion is formed at a wheel circumferential end portion of the sub-air chamber member.

3. The vehicle wheel of claim 1,
wherein the substantially cone-shaped portion is formed integrally with the top plate in addition to with the bottom plate and the side plate.

4. The vehicle wheel of claim 1,
wherein the substantially cone-shaped portion is formed integrally only with the bottom plate and the side plate.

* * * * *